US012563338B2

(12) United States Patent
Torio et al.

(10) Patent No.: US 12,563,338 B2
(45) **Date of Patent: *Feb. 24, 2026**

(54) DIRECTIONAL SOUND-PRODUCING DEVICE

(71) Applicant: Bose Corporation, Framingham, MA (US)

(72) Inventors: Guy Torio, Holliston, MA (US); Edward Maniet, Auburn, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/765,606

(22) Filed: Jul. 8, 2024

(65) Prior Publication Data

US 2024/0365056 A1 Oct. 31, 2024

Related U.S. Application Data

(63) Continuation of application No. 17/743,250, filed on May 12, 2022, now Pat. No. 12,058,492.

(51) Int. Cl.
*H04R 1/40* (2006.01)
*H04S 7/00* (2006.01)

(52) U.S. Cl.
CPC ............... *H04R 1/403* (2013.01); *H04S 7/30* (2013.01); *H04S 2400/01* (2013.01)

(58) Field of Classification Search
None
See application file for complete search history.

(56) References Cited

U.S. PATENT DOCUMENTS 3,624,298 A * 11/1971 Davis ........................ H03G 5/10 381/98
8,345,883 B2 1/2013 Takumai et al.
2004/0105559 A1* 6/2004 Aylward .................. H04S 3/00 381/103
2006/0147056 A1* 7/2006 Klayman ................ H04S 1/002 381/98

(Continued)

FOREIGN PATENT DOCUMENTS

JP 4127156 B2 7/2008
JP 2015530825 A 10/2015
WO 2020/181288 A1 9/2020

OTHER PUBLICATIONS

Search Report and Written Opinion from PCT/US2023/022002 dated Aug. 29, 2023, 7 pages.

*Primary Examiner* — Duc Nguyen
*Assistant Examiner* — Assad Mohammed
(74) *Attorney, Agent, or Firm* — Hoffman Warnick LLC

(57) ABSTRACT

A sound-producing device includes a housing having a front and a top, a first electro-acoustic transducer facing from the front of the housing, a second electro-acoustic transducer facing from the top of the housing, and a third electro-acoustic transducer facing from the top of the housing. There is at least one processor that is configured to, during audio playback, generate a first array using the first and second electro-acoustic transducers, the first array providing a left height component of the audio playback, and generate a second array using the first and third electro-acoustic transducers, the second array providing a right height component of the audio playback.

16 Claims, 7 Drawing Sheets

(56) References Cited

U.S. PATENT DOCUMENTS

| | | | | |
|---|---|---|---|---|
| 2014/0023363 | A1* | 1/2014 | Apte | H05B 47/19<br>370/254 |
| 2015/0223002 | A1* | 8/2015 | Mehta | H04S 7/30<br>381/303 |
| 2015/0382108 | A1 | 12/2015 | Takumai et al. | |
| 2016/0182996 | A1* | 6/2016 | Takumai | H04R 29/002<br>381/303 |
| 2017/0127211 | A1* | 5/2017 | Crockett | H04R 1/26 |
| 2017/0294126 | A1* | 10/2017 | Russell, Jr. | E01F 9/662 |
| 2018/0132034 | A1* | 5/2018 | Burette | H04R 5/02 |
| 2019/0098412 | A1* | 3/2019 | Chen | H04R 1/288 |
| 2020/0021909 | A1 | 1/2020 | Smithers et al. | |
| 2021/0200264 | A1* | 7/2021 | Kim | G06F 1/1601 |
| 2021/0204085 | A1* | 7/2021 | Claar | H04S 7/304 |
| 2022/0159397 | A1* | 5/2022 | Starobin | H04R 1/26 |

* cited by examiner

DIRECTIONAL SOUND-PRODUCING DEVICE

PRIORITY CLAIM

This application is a continuation of, and claims priority to, U.S. patent application Ser. No. 17/743,250 (filed May 12, 2022), the entire contents of which are incorporated by reference herein.

TECHNICAL FIELD

This disclosure relates to sound-producing devices, methods, and related computer program products.

BACKGROUND

Reproduction of object-based audio requires height components in order to accomplish three-dimensional placement of sound objects. Audio devices and systems without overhead speakers are not natively configured to reproduce height components of object-based audio.

SUMMARY

Aspects and examples are directed to sound-producing devices that include loudspeakers that are generally coplanar and so are natively configured to provide a surround-sound output with a number (typically 5 or 7) of horizontal output channels. In the present disclosure the loudspeakers are used to generate left and right loudspeaker arrays that provide left and right height components of the audio playback without any speakers located above the listening position.

All examples and features mentioned below can be combined in any technically possible way.

In one aspect, a sound-producing device includes a housing having a front and a top, a first electro-acoustic transducer facing from the front of the housing, a second electro-acoustic transducer facing from the top of the housing, a third electro-acoustic transducer facing from the top of the housing, and at least one processor that is configured to, during audio playback, generate a first array using the first and second electro-acoustic transducers, the first array providing a left height component of the audio playback, and generate a second array using the first and third electro-acoustic transducers, the second array providing a right height component of the audio playback.

Some examples include one of the above and/or below features, or any combination thereof. In some examples the first electro-acoustic transducer is located between the second electro-acoustic transducer and the third electro-acoustic transducer. In an example the front and top of the housing are perpendicular to each other.

Some examples include one of the above and/or below features, or any combination thereof. In some examples all of the electro-acoustic transducers used to generate the first array receive the same audio source signal and all of the electro-acoustic transducers used to generate the second array receive the same audio source signal. In an example the first array and the second array each comprise array filters that are applied to the audio source signal for each of the electro-acoustic transducers of the respective array. In an example the array filters for the second and third electro-acoustic transducers comprise broadband filters.

Some examples include one of the above and/or below features, or any combination thereof. In an example the array filter for the first electro-acoustic transducer rolls off above a predetermined frequency. In some examples the array filter for the first electro-acoustic transducer comprises a bandpass filter. In an example the bandpass filter has a low-frequency threshold of about 600 Hz and a high-frequency cutoff of about 2 kHz. In an example all of the array filters comprise non-minimum phase filters.

Some examples include one of the above and/or below features, or any combination thereof. In some examples the first and second arrays are applied only across an array frequency range. In an example the array frequency range is from about 600 Hz to about 6 kHz. In an example the first electro-acoustic transducer has a bandwidth of from about 600 Hz to about 18 kHz.

Some examples include one of the above and/or below features, or any combination thereof. In some examples the housing has a left end and a right end, the device further comprises a fourth electro-acoustic transducer facing from the left end of the housing and a fifth electro-acoustic transducer facing from the right end of the housing, and the processor is further configured to, during audio playback, generate a third array using the first, second, third, fourth and fifth electro-acoustic transducers, the third array providing a left component of the audio playback, and generate a fourth array using the first, second, third, fourth and fifth electro-acoustic transducers, the fourth array providing a right component of the audio playback. In an example the processor is further configured to, during audio playback, generate a fifth array using the first, second, third, fourth and fifth electro-acoustic transducers, the fifth array providing a center component of the audio playback. In an example the processor is further configured to, during audio playback, generate a sixth array based on a combination of the first and third arrays, the sixth array providing a left surround component of the audio playback, and generate a seventh array based on a combination of the second and fourth arrays, the seventh array providing a right surround component of the audio playback.

In another aspect a computer program product having a non-transitory computer-readable medium including computer program logic encoded thereon that, when executed on a sound-producing device that includes a housing having a front and a top, a first electro-acoustic transducer facing from the front of the housing, a second electro-acoustic transducer facing from the top of the housing, and a third electro-acoustic transducer facing from the top of the housing, causes the sound-producing device to, during audio playback, generate a first array using the first and second electro-acoustic transducers, the first array providing a left height component of the audio playback, and generate a second array using the first and third electro-acoustic transducers, the second array providing a right height component of the audio playback.

Some examples include one of the above and/or below features, or any combination thereof. In an example the first electro-acoustic transducer is located between the second electro-acoustic transducer and the third electro-acoustic transducer. In an example all of the electro-acoustic transducers used to generate the first array receive the same audio source signal and all of the electro-acoustic transducers used to generate the second array receive the same audio source signal, and wherein the first array and the second array each comprise array filters that are applied to the audio source signal for each of the electro-acoustic transducers of the respective array. In an example the array filters for the second and third electro-acoustic transducers comprise broadband filters and the array filter for the first electro-acoustic transducer comprises a bandpass filter.

In some examples, the left height component has a main radiation axis falling generally along a line that intercepts the first and second electro-acoustic transducer.

In some examples, a sound-producing device includes: a housing having a front and a top, wherein the top is transverse to the front; a first electro-acoustic transducer facing from the front of the housing; a second electro-acoustic transducer facing from the top of the housing; a third electro-acoustic transducer facing from the top of the housing; and at least one processor configured to, during audio playback, generate a first array using the first and second electro-acoustic transducers, the first array providing a left height component of the audio playback that is directed generally outwardly from the top of the housing, and generate a second array using the first and third electro-acoustic transducers, the second array providing a right height component of the audio playback that is directed generally outwardly from the top of the housing.

In some examples, the first electro-acoustic transducer is located between the second electro-acoustic transducer and the third electro-acoustic transducer.

In some examples, the right height component has a main radiation axis falling generally along a line that intercepts the first and third electro-acoustic transducers.

In some examples, the left height component and the right height component are each directed generally outwardly from the top of the housing.

In some examples, the left height component has a main radiation axis falling generally along a line that intercepts the first and second electro-acoustic transducers.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

Figure 1:
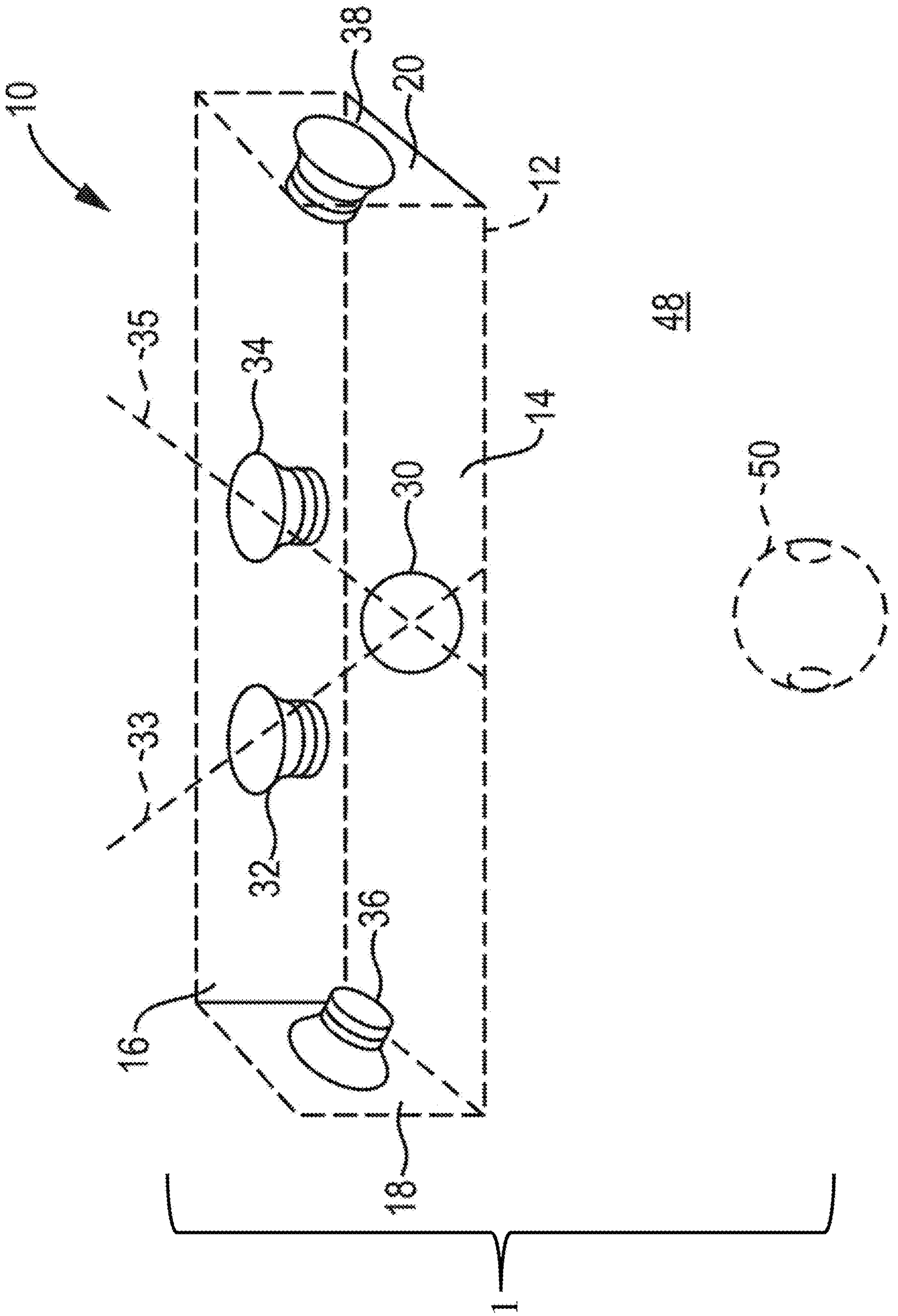
FIG. 1 is a schematic diagram of a sound-producing device in a listening space.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

The audio sources for object-based audio such as Dolby Atmos and DTS: X include spatial metadata. To properly render object-based audio the audio device(s) must have the capability to locate sounds in three-dimensional space. Audio devices such as soundbars that are often used for audio for video applications, as well as traditional surround-sound systems, are configured to produce horizontal sound that is generally in the plane that includes the expected listening location, and so are not natively capable of placing sounds in three-dimensional space. Such audio devices and systems are thus not able to faithfully reproduce object-based audio.

In some examples the present audio device is configured as a soundbar, with a housing that is generally in the shape of a rectangular prism with a front that generally faces the expected listening position in front of the television/monitor, a top that faces up (toward the ceiling of the room), and ends that face to the left and right. In some examples the center loudspeaker is in the front face, and there are left and right upward-facing loudspeakers in the top face of the housing close to and to the left and right of the center loudspeaker, respectively.

Soundbars are designed to be located close to a television or video monitor, usually just below it. Soundbars often include three to five loudspeakers that are all more or less co-planar. In order to reproduce object-based audio the soundbar needs to be configured to develop the traditional horizontal surround-sound channels (e.g., center, left, right, left surround, and right surround) and also needs to be configured to develop left and right height components, but without any loudspeakers located above the listener. In an example of the present disclosure the left height component is provided using a loudspeaker array that includes the center loudspeaker and the left upwardly-facing loudspeaker. In an example the right height component is provided using a loudspeaker array that includes the center loudspeaker and the right upwardly-facing loudspeaker.

Examples of the systems, methods and apparatuses discussed herein are not limited in application to the details of construction and the arrangement of components set forth in the following description or illustrated in the accompanying drawings. The systems, methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the devices, computer program products, systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Active loudspeaker arrays incorporate more than a single loudspeaker or element, where each speaker is driven by its own digital signal processor (DSP) and amplifier channel. In general, active loudspeaker arrays have the following properties: two or more loudspeakers, all speakers receive the same source channel signal, and there is a unique transfer function, array filter (magnitude and phase per frequency) for each speaker driven by each source channel input. If there are multiple source channels, the additional source channels along with their associated array filters are summed together just prior to the individual loudspeakers.

In an example a minimum speaker set solution includes five loudspeakers arranged in a housing. In some examples the housing has a general rectangular prism shape wherein the front face and the top face are generally perpendicular. By generally perpendicular we mean that the front face is planar or close to planar and the top face is planar or close to planar (e.g., the faces might be rounded but generally will approximate a plane), and the front and top planes are at about 90 degrees to each other, generally within about plus or minus 15 degrees, and generally at most within about plus or minus 45 degrees to each other. In an example the center loudspeaker in the front face is a "twiddler" that has a resonance frequency that is optimized to cover the mid and treble frequency range (which in some examples is from about 600 Hz to about 18 kHz). In an example this center speaker is the primary center channel speaker. In an example the center speaker directly faces toward the expected listening position. In an example the left and right upwardly-facing or "up" speakers are full range (bass producing) loudspeakers that face directly up (for example with their primary radiation axes at about 90 degrees to the primary radiation axis of the center speaker) and are located close (e.g., in some examples as close as possible given hardware and housing constraints) to the center speaker. In some examples the left and right up speakers are located in the housing such that their main radiation axes are transverse to the main radiation axis of the center speaker, and pointed up. The angle between the main radiation axes of the left and right up speakers and the center speaker in examples can range from about 30 degrees to about 150 degrees. Also, in some examples there is a left speaker that is in or close to the left end of the housing and a right speaker that is in or close to the right end of the housing. In some examples both the left and right speakers are full-range speakers and face generally directly left and right, perhaps within about plus or minus 15-45 degrees of perpendicular to primary radiation axis of the center speaker and to the ends of the housing when the ends are generally planar and generally perpendicular to the front face of the housing. Note that the housing need not have faces. For example the housing can include a support structure that holds the loudspeakers and other hardware, with the loudspeakers located as described. The structure can be fully or partially wrapped or covered in a more decorative outer face that, at least in the parts that overlie the loudspeakers, is configured to pass sound into the external environment.

With this loudspeaker arrangement, the device and system is configured to accomplish up to five unique active acoustic arrays: center, left, right, left height, and right height. For surround source channels a combination of the left and left height arrays is used to create the left surround channel and similarly a combination of the right and right height arrays is used to create the right surround channel. The active arrays cover much of the midrange frequencies, while the directionality of the individual speakers take over in the high frequency range. In an example the bass frequency range is not arrayed. Instead, all four full range speakers (i.e., all except the center speaker) are driven in phase for maximum efficiency.

Generally, for height channels it is desirable to attenuate energy projected forward towards the listening space. An arrangement such as described above, with the center speaker in the front of the housing and the left and right up speakers in the top of the housing close to but left and right of the center speaker, is beneficial for the left and right height arrays and also has minimal impact on the center channel array.

In examples herein a sound-producing device includes a housing having a front and a top. There is a first electro-acoustic transducer facing from the front of the housing, a second electro-acoustic transducer facing from the top of the housing, and a third electro-acoustic transducer facing from the top of the housing. The device includes processing capability that during audio playback is configured to generate a first array using the first and second electro-acoustic transducers, the first array providing a left height component of the audio playback, and generate a second array using the first and third electro-acoustic transducers, the second array providing a right height component of the audio playback. In an example the first and second arrays are applied only across an array frequency range. The array frequency range is in some examples from about 600 Hz to about 6 kHz, or more generally from a low frequency that is not arrayed (which can in some examples include the lowest frequencies) to a high frequency where the directionality of the individual speakers takes over, which is dependent in part on the particular speaker design and can in some examples be plus or minus about 3 kHz from this about 6 kHz target. Examples herein also include computer program products having a non-transitory computer-readable medium including computer program logic encoded thereon that, when executed, accomplish the functions described herein.

In examples, the first electro-acoustic transducer is located between the second electro-acoustic transducer and the third electro-acoustic transducer. In a specific example the front and top of the housing are perpendicular to each other. In an example the first electro-acoustic transducer is a twiddler with a bandwidth of from about 600 Hz to about 18 kHz and the second and third transducers are full-range transducers.

In some examples all of the electro-acoustic transducers used to generate the first array receive the same audio source signal and all of the electro-acoustic transducers used to generate the second array receive the same audio source signal. The first array and the second array each comprise array filters that are applied to the audio source signal for each of the electro-acoustic transducers of the respective array. In examples, the array filters for the second and third electro-acoustic transducers comprise broadband filters. More specifically, in some examples the array filter for the first electro-acoustic transducer rolls off above a predetermined frequency. In an example the array filter for the first electro-acoustic transducer comprises a bandpass filter. In a specific non-limiting embodiment the bandpass filter has a low-frequency threshold of about 600 Hz and a high-frequency cutoff of about 2 kHz. In some examples the low frequency threshold ranges from about 200 Hz to about 600 Hz. In some examples the high frequency cutoff ranges from about 2 kHz to about 4 kHz. All of the array filters are typically non-minimum phase filters.

In examples of the present disclosure the housing also has a left end and a right end, and the device includes a fourth electro-acoustic transducer facing from the left end of the housing and a fifth electro-acoustic transducer facing from the right end of the housing. In this example the processor during audio playback generates a third array and a fourth array, both using the first, second, third, fourth and fifth electro-acoustic transducers. The third array provides a left component of the audio playback and the fourth array provides a right component of the audio playback.

In an example the processor also generates a fifth array that also uses the first, second, third, fourth and fifth electro-acoustic transducers. The fifth array provides a center component of the audio playback. For examples with left and right surround components the processor generates sixth and seventh arrays, where the sixth array provides the left surround component and the seventh array provides the right surround component. In some examples the sixth array is based on a combination of the first and third arrays. In some examples the seventh array is based on a combination of the second and fourth arrays.

FIG. 1 is a schematic diagram of a sound-producing device 10 (e.g., a soundbar) in a listening space 48 with user 50 represented by a head seen from behind. Soundbar housing 12 (shown in phantom so that its sides and the speakers can be seen) has a generally rectangular prism shape with six generally rectangular, generally flat, and generally perpendicular sides, including front 14, top 16, left end 18 and right end 20 (the bottom and back sides are not numbered and not further described herein). A soundbar need not have flat faces, need not have a rectangular prism shape, and need not have perpendicular sides. Generally, though, soundbars include elongated housings that have a front, a top, and left and right ends.

In an example described herein device 10 includes five loudspeakers, all of which are configured to be arrayed under control of a processor or the like (not shown in FIG. 1). Center speaker 30 is carried such that it faces from housing front 14. Ideally, and by design of device 10, device 10 is placed in listening space 48 such that the primary radiation axis of center speaker 30 is directed toward listener 50. Left and right up speakers 32 and 34 are carried such that they face from housing top 16, and by design of device 10 have their primary radiation axes pointed up, about perpendicular to the axis of center speaker 30, or at a non-perpendicular angle as described above. In an example speakers 32 and 34 are located close to and to the left and right, respectively, of center speaker 30. In an example speakers 32 and 34 are as close as physically possible to speaker 30 given the particular speakers used and the soundbar construction and functionality. As explained in more detail elsewhere herein, speakers 30 and 32 are arrayed to provide a left height component of the audio output with its main radiation axis falling generally along line 33 that intercepts both speakers, and speakers 30 and 34 are arrayed to provide a right height component of the audio output with its main radiation axis falling generally along line 35 that intercepts both speakers.

Figure 2:
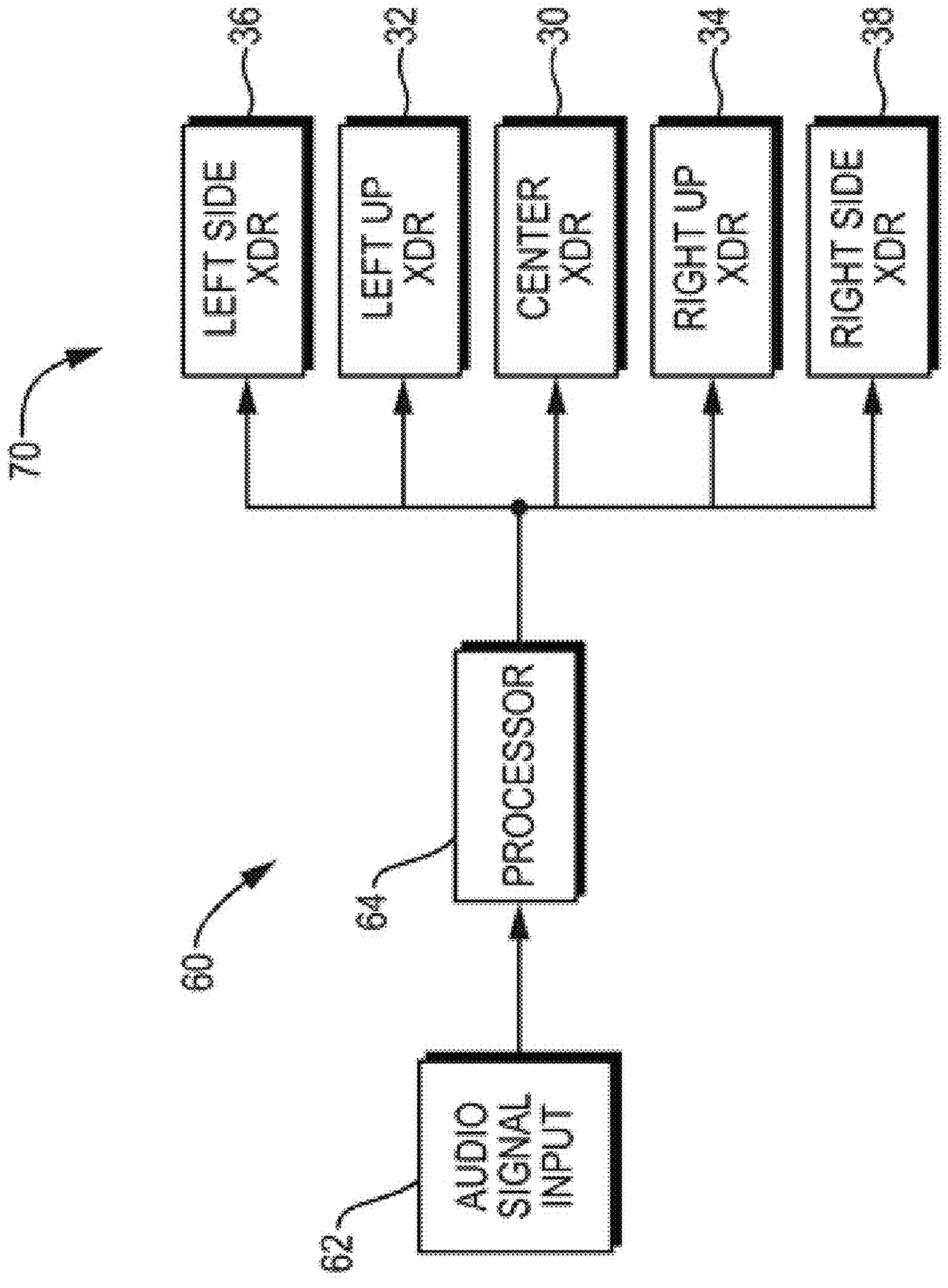
FIG. 2 is a block diagram of a sound-producing device.

FIG. 2 is a block diagram of active elements 60 of sound-producing device 10. Audio signal input 62 can be accomplished wirelessly or not. For a soundbar, the audio input is often received from the television or monitor, and typically using a hard connection such as an HDMI or optical cable. Wireless sound input is typically accomplished using Bluetooth or WiFi. However, the technology and means by which audio is received is not a limitation. Processor 64 receives the input audio and uses a non-transitory computer-readable medium including computer program logic encoded thereon that, when executed, is configured to use the transducer set 70 (which includes transducers 30, 32, 34, 36, and 38) to generate the arrays described herein that accomplish the audio outputs. Processor 64 in some examples is a DSP.

Figure 3:
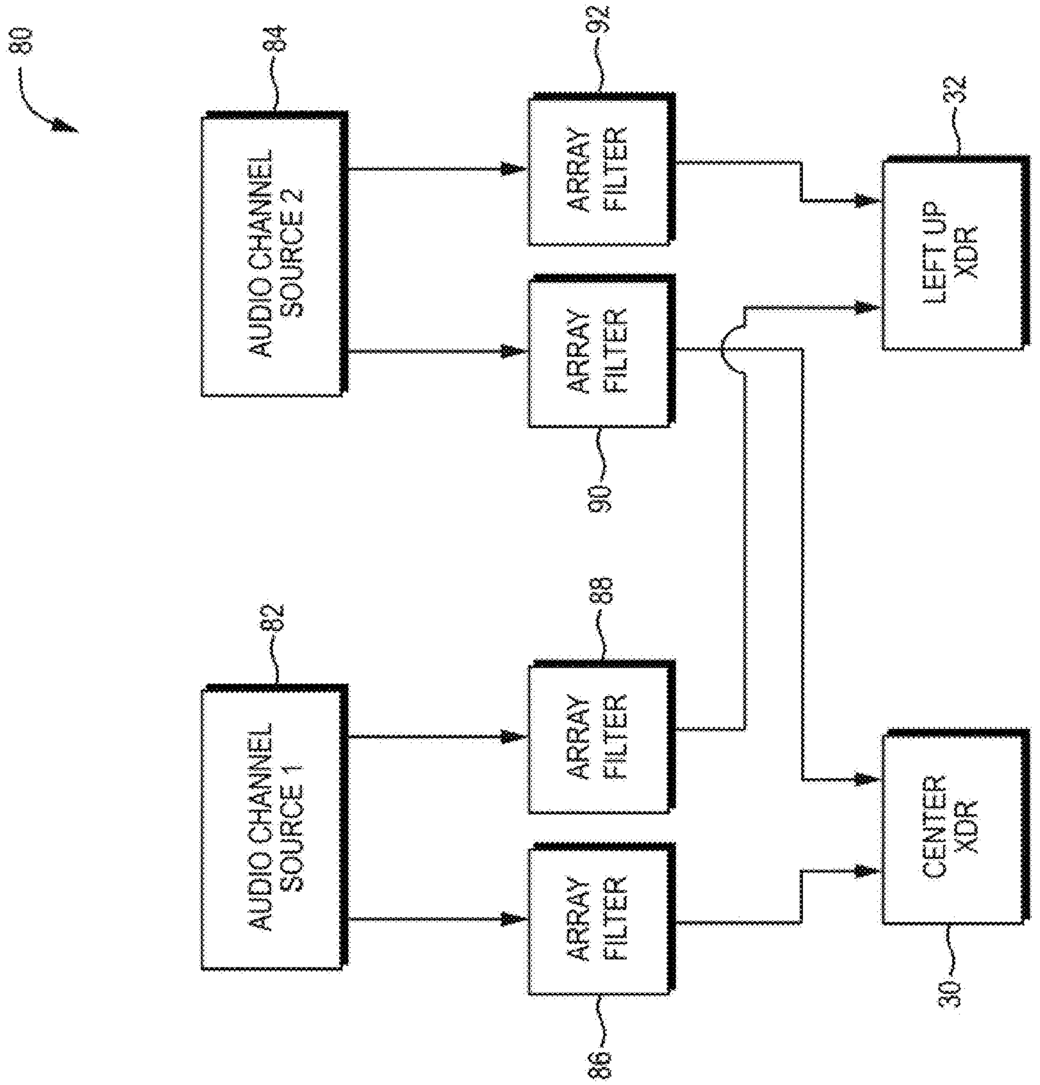
FIG. 3 is a block diagram of audio sources and filters for a loudspeaker array for a sound-producing device.

FIG. 3 is a block diagram of audio sources and filters 80 for a loudspeaker array for a sound-producing device. In this example the array is the left height array. In this example two audio channel sources 82 and 84 are used. In an example sources 82 and 84 are the left height and right height source channels in a Dolby Atmos 5.1.2 audio stream where the 0.2 designates the two height source channels. However, there can be one, two, or more audio channel sources for any or all of the described arrays. In the subject device, system, and methods one or more audio sources can be used to create the different components of the audio playback, such as an audio playback with two or more height components (e.g., a 5.1.2 output or a 5.0.2 output without a subwoofer that might be created using only the soundbar described herein).

As described above, in order to reproduce object-based audio a soundbar needs to be configured to develop the traditional horizontal surround-sound channels (e.g., center, left, right, left surround, and right surround) and also needs to be configured to develop left and right height components, but without any loudspeakers located above the listener. In an example of the present disclosure the left height component is provided using a loudspeaker array that includes the center loudspeaker 30 and the left upwardly-facing loudspeaker 32. In an example the right height component is provided using a loudspeaker array that includes the center loudspeaker 30 and the right upwardly-facing loudspeaker 34. Also, there is an array filter for each audio channel source and for each transducer of the array. Thus in the example illustrated in FIG. 3, where the left height array includes two transducers 30 and 32, there are four array filters 86, 88, 90, and 92, each filter configured for one source channel and one output transducer. In some examples the two height arrays are super-directive arrays that maximize directivity upward and away from the listening position, and minimize acoustic energy directed toward the listening position. Also, in some examples the array filters are non-minimum phase filters of at least 12th order and preferably at least 16th order.

Figure 4:
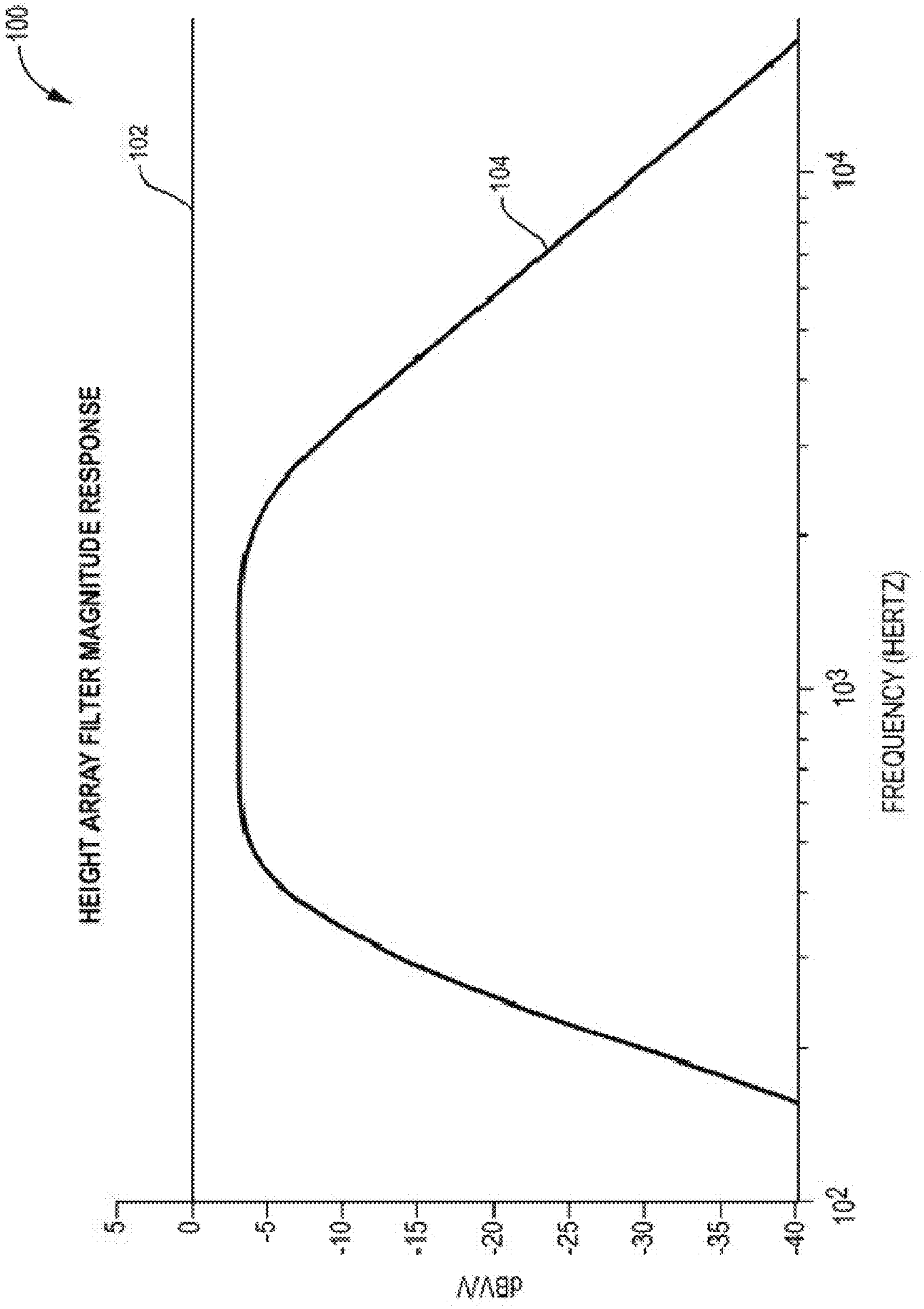
FIG. 4 includes magnitude responses of exemplary filters for the loudspeakers of a height array of a sound-producing device.

FIG. 4 illustrates exemplary magnitude response curves of exemplary filter set 100 for a height array of a sound-producing device, for example the left and right height arrays described above that use the center speaker and either the left or right upwardly-directed speaker. Filter response 102 is a broadband filter for the left or right height (or up) loudspeaker while filter response 104 is a bandpass filter for the center speaker. In some examples and as further described above this bandpass filter has a low-frequency threshold of about 300 Hz to about 600 Hz, and a high-frequency cutoff of about 2 kHz to about 4 kHz. These filters accomplish arraying at midrange frequencies (which are further described above and are typically defined as from about 600 Hz to about 2 kHz). At higher frequencies the distance between the transducers limits the ability to array; when the inter-transducer distance is greater than about half the wavelength of sound there is no directionality control that can be accomplished by arraying. Also, most loudspeakers become directional at higher frequencies, for example from about 6 kHz up dependent on the loudspeaker construction. Thus as frequency increases any effects of arraying decrease. Accordingly, the five active arrays cover much of the midrange frequencies while the directionality of the individual speakers take over in the high frequency range. In some examples arraying is not used in the bass frequency range. Instead, all four full-range speakers are driven in phase for maximum efficiency. Thus, bass can be created without the need for a subwoofer, although the audio system can include a subwoofer.

Figure 5A:
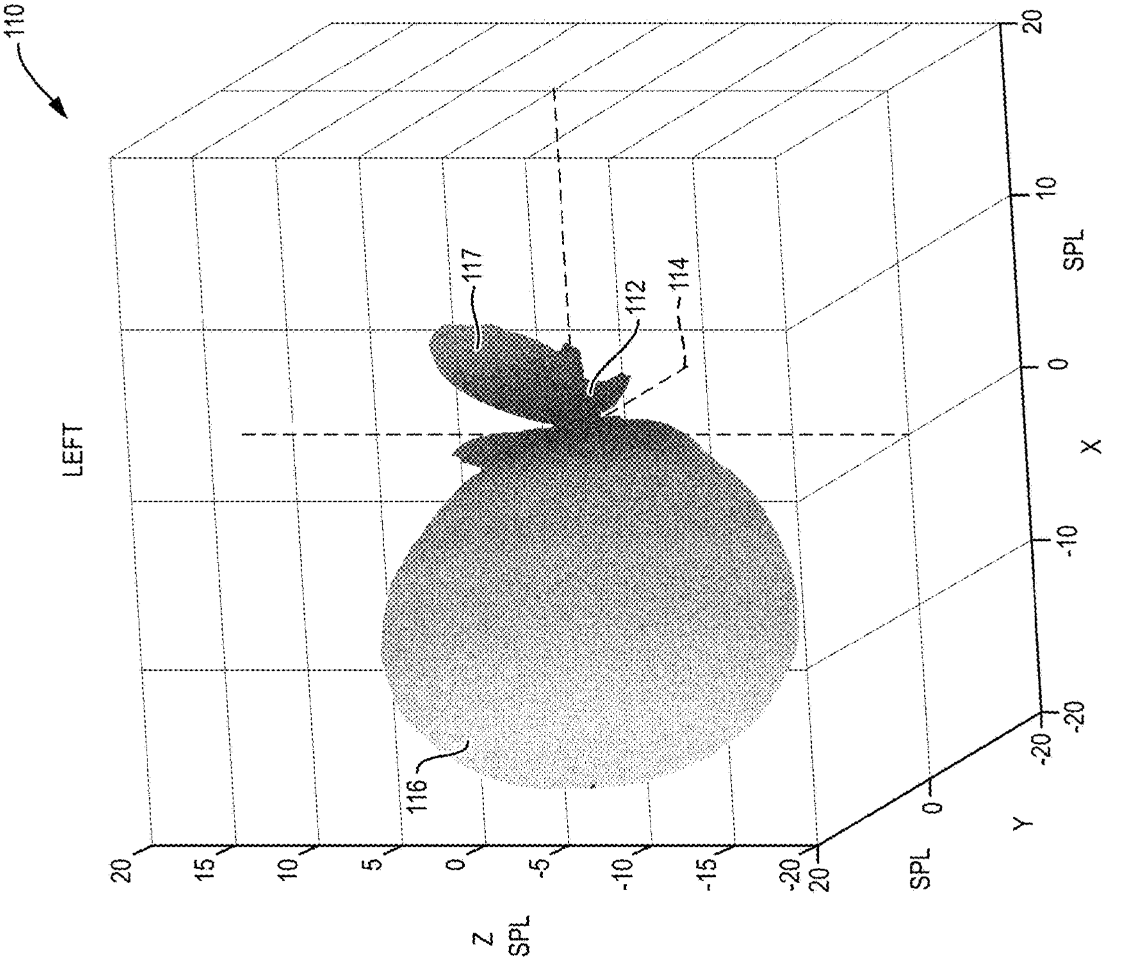
FIGS. 5A, 5B, and 5C are representations of the three-dimensional directionalities for left, left height and center playback channels of an exemplary sound-producing device, respectively.
Figure 5B:
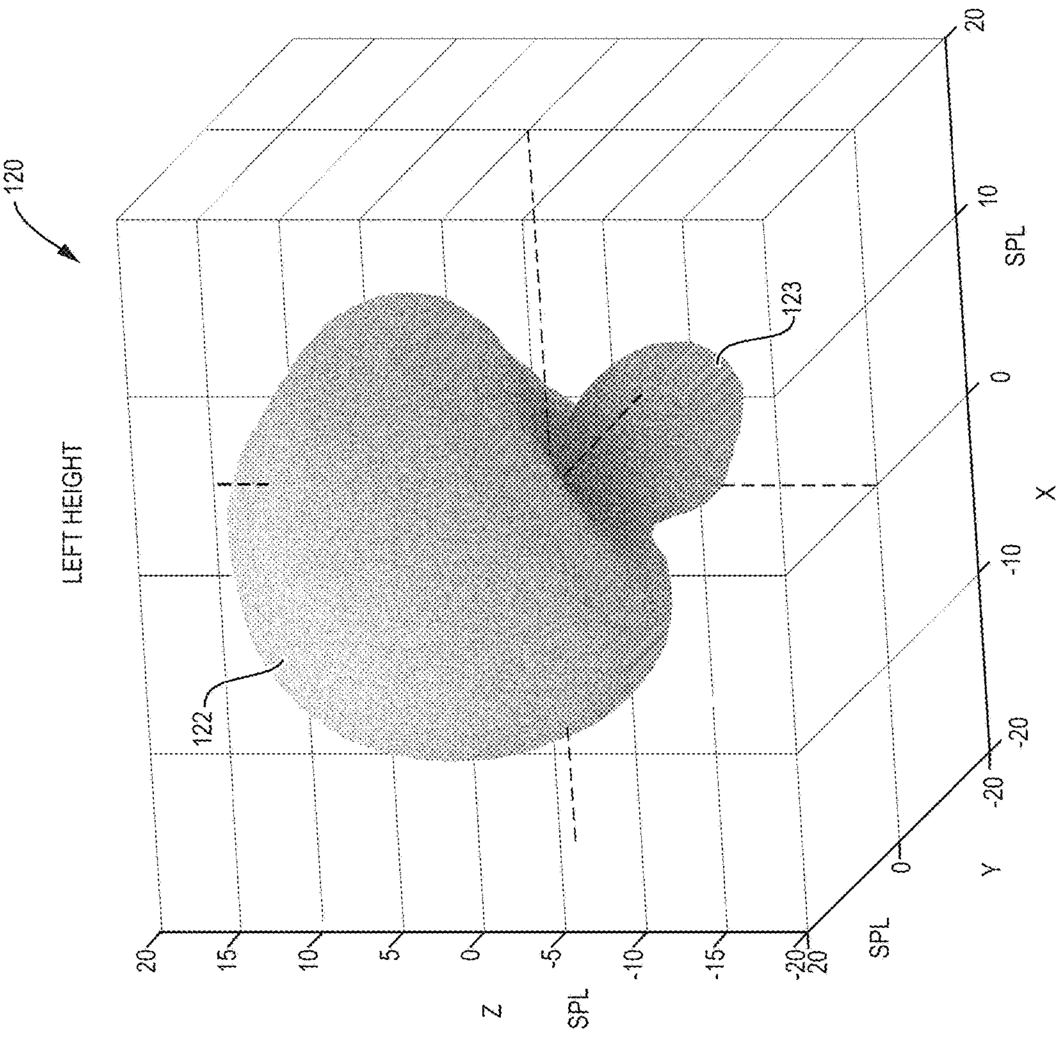
Figure 5C:
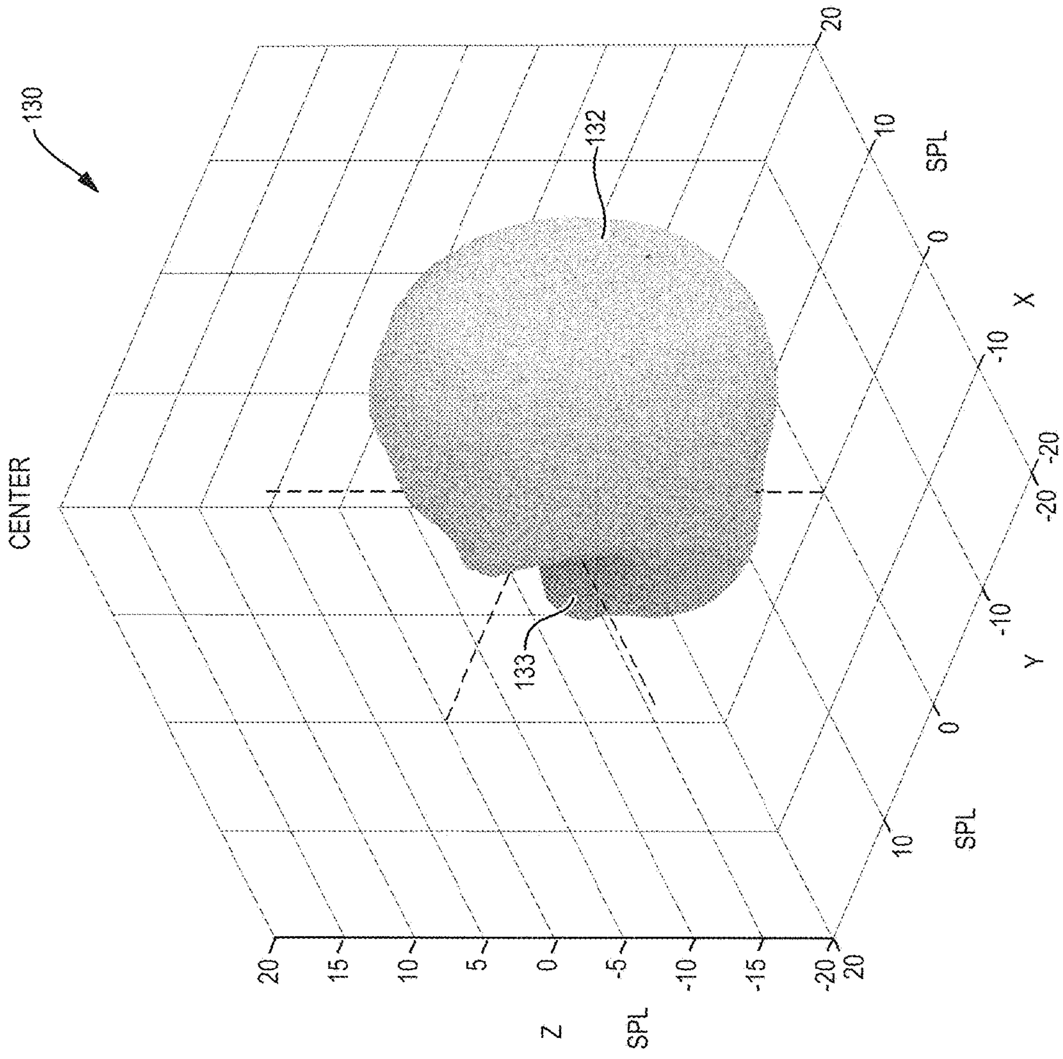

FIGS. 5A, 5B, and 5C are representations of exemplary three-dimensional directionalities for left, left height and center playback channels, respectively, of an exemplary sound-producing device. Using the described five speaker layout in a soundbar configuration as a basis for acoustic system design, independent spatial coverage for the different ATMOS or other object-based audio rendering channels is achieved. As an example, FIGS. 5A-5C illustrate three-dimensional acoustic radiation patterns at sample midrange frequencies for left, left height and center arrays, respectively. In an example the sample midrange frequencies are about 600 Hz to about 900 Hz. In an example the sound pressure level (SPL) scales is in dB, illustrating a range of 20 dB. The right and right height arrays are mirror images of the left and left height arrays that are illustrated. As mentioned previously, the surround channels drive both arrays for a given side (left or right) with a tunable relative gain such that the combination of the surround channels creates an immersive sound presentation everywhere except in front of the primary listening space.

In FIGS. 5A-5C, X is the left-right direction (with X=0 centered on the listening space), Y is the front-back direction, and Z is the vertical direction, and sound pressure level is illustrated on a 20 dB scale. The origin of the plot is labelled 112 in FIG. 5A. The left array output (FIG. 5A) has primary lobe 116 that is directed to the left along the Y axis at Y=0, with a smaller secondary lobe 117 pointed in the reverse direction. The secondary lobe is perceptually insignificant relative to main lobe. The left height array output (FIG. 5B) has a primary lobe 122 that is directed backwards (away from the listener) and up and to the left at about 45 degrees up and left and a smaller secondary lobe 123 pointed in the reverse direction. To achieve a unique left and right height presentation, the angle of the heights should be in about a 30 to 60-degree range relative to the vertical (Z) axis. The height output is away from rather than toward the user because since the center speaker is naturally at the front of the soundbar housing and the height speakers are in the top of the housing, the height speakers are located a bit behind the center speaker. The left and right height array directions (33 and 35, FIG. 1) are thus pointed slightly backward. The height channel sound reaches the listener after reflection from the ceiling and so has essentially the same effect as would sound emanating from a speaker located above the listener. The center array output (FIG. 5C) has a primary lobe 132 that is directed outward toward the listening position along the Y axis, at X=0 and a smaller secondary lobe 133 that is pointed in the reverse direction. As pictured in FIGS. 5A-5C the primary lobes point in the desired directions and for the left, right, left height and right height outputs there is minimal energy directed into the listening space; a desired goal is to have at least a 15 dB difference in SPL between the primary direction and the direction of the listening space.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For case of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

Functions, methods, and/or components of the methods and systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuits) (ASIC), general computing processor(s), micro-controller (s), and the like, or any combination of these, may be suitable, and may include analog or digital circuit components and/or other components with respect to any particular implementation.

Functions and components disclosed herein may operate in the digital domain, the analog domain, or a combination of the two, and certain examples include analog-to-digital converters) (ADC) and/or digital-to-analog converter(s) (DAC) where appropriate, despite the lack of illustration of ADC's or DAC's in the various figures. Further, functions and components disclosed herein may operate in a time domain, a frequency domain, or a combination of the two, and certain examples include various forms of Fourier or similar analysis, synthesis, and/or transforms to accommodate processing in the various domains.

Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

The term "approximately" as used with respect to values herein can allot for a nominal variation from absolute values, e.g., of several percent or less. Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). Similarly, the term "in response to" is used to indicate any of its ordinary meanings, including "in response to at least."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Any incorporation by reference of a portion of a document shall also be understood to incorporate definitions of terms or variables that are referenced within the portion, where such definitions appear elsewhere in the document, as well as any figures referenced in the incorporated portion.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another or may be physically separate. One element may perform the actions of more than one block. Audio signals may be encoded or not and may be transmitted in either digital or analog form. Conventional audio signal processing equipment and operations are in some cases omitted from the drawings.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

We claim:

1. A sound-producing device comprising:

a housing having a front and a top;

a first electro-acoustic transducer facing from the front of the housing;

a second electro-acoustic transducer facing from the top of the housing;

a third electro-acoustic transducer facing from the top of the housing; and at least one processor configured to, during audio playback, generate a first array using the first and second electro-acoustic transducers, the first array providing a left height component of the audio playback, and generate a second array using the first and third electro-acoustic transducers, the second array providing a right height component of the audio playback, wherein all of the electro-acoustic transducers used to generate the first array receive the same audio source signal and all of the electro-acoustic transducers used to generate the second array receive the same audio source signal, wherein the first array and the second array each comprise array filters that are applied to the audio source signal for each of the electro-acoustic transducers of the respective array, wherein all of the array filters comprise non-minimum phase filters, and wherein each of the first array and the second array includes four array filters each configured for one source channel and one output transducer.

2. The sound-producing device of claim 1, wherein the first electro-acoustic transducer is located between the second electro-acoustic transducer and the third electro-acoustic transducer.

3. The sound-producing device of claim 1, wherein the front and top of the housing are perpendicular to each other, and wherein the left height component and the right height component are each directed generally outwardly from the top of the housing.

4. The sound-producing device of claim 1, wherein the array filters for the second and third electro-acoustic transducers comprise broadband filters.

5. The sound-producing device of claim 1, wherein the array filter for the first electro-acoustic transducer rolls off above a predetermined frequency.

6. The sound-producing device of claim 1, wherein the array filter for the first electro-acoustic transducer comprises a bandpass filter with a low-frequency threshold of about 600 Hz and a high-frequency cutoff of about 2 kHz, thereby providing arraying at midrange frequencies.

7. The sound-producing device of claim 1, wherein the first and second arrays are applied only across an array frequency range, wherein the array frequency range is from about 600 Hz to about 6 kHz.

8. The sound-producing device of claim 1, wherein the first electro-acoustic transducer has a bandwidth of from about 600 Hz to about 18 kHz.

9. The sound-producing device of claim 1, wherein the housing has a left end and a right end, the device further comprises a fourth electro-acoustic transducer facing from the left end of the housing and a fifth electro-acoustic transducer facing from the right end of the housing, and wherein the processor is further configured to, during audio playback, generate a third array using the first, second, third, fourth and fifth electro-acoustic transducers, the third array providing a left component of the audio playback, and wherein the processor is further configured to, during audio playback, generate a fourth array using the first, second, third, fourth and fifth electro-acoustic transducers, the fourth array providing a right component of the audio playback, generate a fifth array using the first, second, third, fourth and fifth electro-acoustic transducers, the fifth array providing a center component of the audio playback, generate a sixth array based on a combination of the first and third arrays, the sixth array providing a left surround component of the audio playback, and generate a seventh array based on a combination of the second and fourth arrays, the seventh array providing a right surround component of the audio playback.

10. The sound producing device of claim 1, wherein the right height component has a main radiation axis falling generally along a line that intercepts the first and third electro-acoustic transducers.

11. A computer program product having a non-transitory computer-readable medium including computer program logic encoded thereon that, when executed on a sound-producing device that includes a housing having a front and a top that is transverse to the front, a first electro-acoustic transducer facing from the front of the housing, a second electro-acoustic transducer facing from the top of the housing, and a third electro-acoustic transducer facing from the top of the housing, causes the sound-producing device to, during audio playback, generate a first array using the first and second electro-acoustic transducers, the first array providing a left height component of the audio playback, and generate a second array using the first and third electro-acoustic transducers, the second array providing a right height component of the audio playback, wherein all of the electro-acoustic transducers used to generate the first array receive the same audio source signal and all of the electro-acoustic transducers used to generate the second array receive the same audio source signal, wherein the first array and the second array each comprise array filters that are applied to the audio source signal for each of the electro-acoustic transducers of the respective array, and wherein the array filters for the second and third electro-acoustic transducers comprise broadband filters and the array filter for the first electro-acoustic transducer comprises a bandpass filter.

12. The computer program product of claim 11, wherein the first electro-acoustic transducer is located between the second electro-acoustic transducer and the third electro-acoustic transducer, and wherein the left height component and the right height component are each directed generally outwardly from the top of the housing.

13. A sound-producing device comprising:

a housing having a front and a top;

a first electro-acoustic transducer facing from the front of the housing;

a second electro-acoustic transducer facing from the top of the housing;

a third electro-acoustic transducer facing from the top of the housing; and at least one processor configured to, during audio playback, generate a first array using the first and second electro-acoustic transducers, the first array providing a left height component of the audio playback that is directed generally outwardly from the top of the housing, and generate a second array using the first and third electro-acoustic transducers, the second array providing a right height component of the audio playback that is directed generally outwardly from the top of the housing, wherein all of the electro-acoustic transducers used to generate the first array receive the same audio source signal and all of the electro-acoustic transducers used to generate the second array receive the same audio source signal, wherein the first array and the second array each comprise array filters that are applied to the audio source signal for each of the electro-acoustic transducers of the respective array, and wherein the array filters for the second and third electro-acoustic transducers comprise broadband filters and the array filter for the first electro-acoustic transducer comprises a bandpass filter.

14. The sound-producing device of claim 13, wherein the first electro-acoustic transducer is located between the second electro-acoustic transducer and the third electro-acoustic transducer.

15. The sound-producing device of claim 1, wherein the first electro-acoustic transducer is common to both the first array and the second array.

16. The sound-producing device of claim 1, wherein the housing further includes a first end and a second end extending between the front and the top, and wherein the second electro-acoustic transducer and the third electro-acoustic transducer are each located closer to the first electro-acoustic transducer than to the first and the second end, respectively.

* * * * *